Jan. 12, 1965  G. T. McCLURE  3,165,293
ANGLE COCK
Filed Dec. 20, 1961

INVENTOR.
GLENN T. McCLURE
BY
Ralph W. McIntire, Jr.
ATTORNEY

United States Patent Office 3,165,293
Patented Jan. 12, 1965

3,165,293
ANGLE COCK
Glenn T. McClure, McKeesport, Pa., assignor to Westinghouse Air Brake Company, Wilmerding, Pa., a corporation of Pennsylvania
Filed Dec. 20, 1961, Ser. No. 160,851
1 Claim. (Cl. 251—252)

This invention relates generally to angle cock devices, and relates particularly to an angle cock device having an axially movable valve for controlling the communication between adjacent passages and for effecting a positive seal when closed.

Heretofore, angle cock devices have utilized a ported, axially rotatable, ground, tapered key disposed transversely in a fluid carrying passageway or bore to open or close the passage in response to movement of a cock handle. The construction and assembly of the tapered cock key in its tapered seat in metal to metal contact is a relatively expensive and time consuming operation because of the necessity of grinding or lapping the cock key to its seat to assure effective airtight sealing when closed. Also, a relatively heavy spring is usually employed to maintain tight metal to metal contact of the tapered cock key in the tapered bore seat in the valve body, which requires the exertion of considerable manual effort to turn the cock key. Moreover, special lubrication is required for minimizing the manual force for turning the cock key.

It is an object of this invention to provide an angle cock device that is simple in construction and less costly to manufacture, and characterized by effective seal off of the communicating passages when closed, relatively little exertion of manual effort to operate, long service life without maintenance and without the employment of grinding or lapping operations during manufacture. According to this invention a form of angle cock valve device is provided having an essentially conventional valve body with an operating handle arranged to shift a cylindrical valve element axially into and out of sealing engagement with an O-ring or grommet-type seal anchored in the valve body so as to close and open respectively communication through the valve device.

Other objects of this invention and details of construction will become apparent from the following description of the invention, taken in conjunction with the accompanying drawings, in which.

Figure 1:
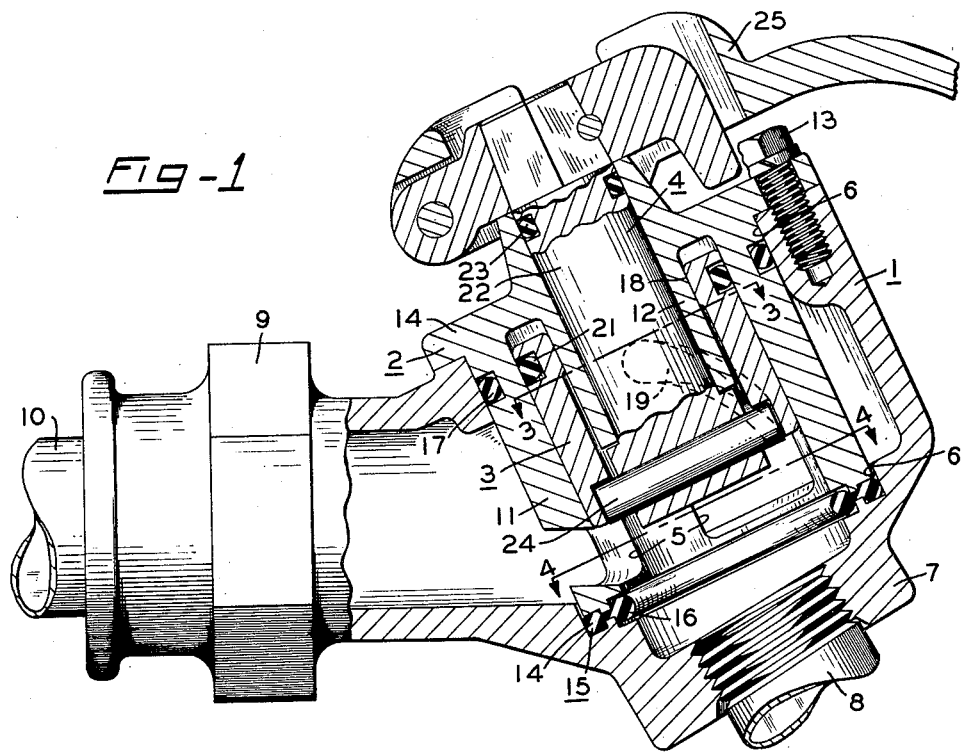
FIG. 1 is a side elevational view, partly in section, of an angle cock device showing the invention.
Figure 3:
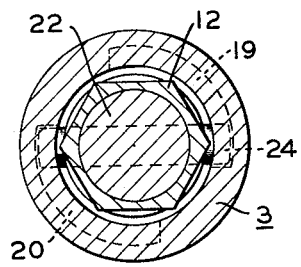
FIG. 3 is a cross-sectional view of the angle cock of FIG. 1, taken substantially along the line 3—3 of FIG. 1.
Figure 4:
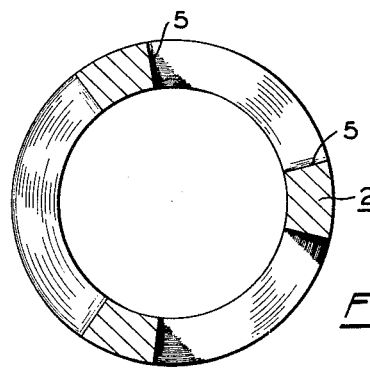
FIG. 4 is a cross-sectional view of the angle cock of FIG. 1, taken substantially along the line 4—4 of FIG. 1.
Figure 2:
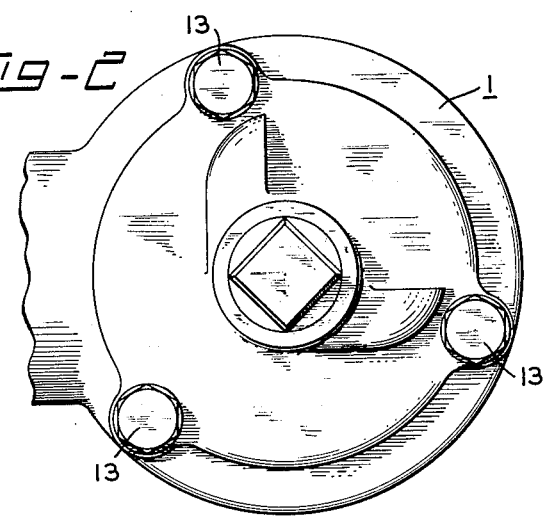
FIG. 2 is a top plan view of the angle cock of FIG. 1, with the valve operating handle removed.

Referring now to FIGS. 1-4 of the drawing, there is shown a valve device having a body generally indicated at 1, a valve housing generally indicated at 2 and disposed in the body 1, a hollow cylindrical valve element generally indicated at 3 and disposed for reciprocable movement in the valve housing 2, and a valve operating means generally indicated at 4 partly disposed within the housing 2 to operate the valve element and partly disposed externally of the housing for manual operation.

The valve body 1 includes a bore 6 disposed intermediate a threaded connection 7 connected to a railway car air hose 8 on the one side, and a connection 9 on the other side connected to a brake pipe 10.

The valve housing 2 is basically tubular in form and comprises a pair of spaced concentrically disposed cores 11 and 12, the outer core 11 being received in bore 6 in the body 1 and fastened thereon by means of cap screws 13 extending through a flange 14 on the upper end of the cores 11 and 12, with the cap screws extending into suitable threaded aperatures in the body 1. The valve housing 2 bears at the lower end upon the outer ring 14 of a double O-ring 15 comprised of a pair of concentric O-rings 14 and 16 connected in conventional fashion by an integral web. The ring 14 is compressed between the lower end of housing 2 and the bottom of bore 6 to provide a seal, thus disposing ring 16 within the inner periphery of outer core 11 for sealing engagement by the valve element 3 in its downward movement to provide a sealed closure between the hose 8 and brake pipe 10. The inner core 12 is open at the top to receive a stem or shaft of the operating means 4 as hereinafter described, and has a hexagonal outer peripheral (FIG. 3) to prevent rotation of the valve element 3 thereabout as hereinafter described. An O-ring seal 17 is provided in a suitable recess in the outer periphery of core 11 to provide a seal between the valve housing 2 and body 1. The lower end of valve housing 2 is suitably apertured at 5 to provide communication between the brake pipe 10 and the hose 8 when the valve element 3 is in its raised or open position.

It is to be noted that the lower end of bore 6 terminates below the inner periphery of the passage leading to connection 9, thus disposing apertures 5 to provide drainage of moisture from the passage and from body 1.

The valve element 3 comprises a tubular or hollow cylindrical member slidably received on the outer periphery of inner core member 12 in the space between cores 11 and 12, and comprises a counter-bored hexagonal hole 18 mating with the outer periphery of inner core 12 to permit axial motion of the valve element 3 with respect to the axis of cores 11 and 12, and at the same time prevent rotational movement of valve element 3 about its axis with respect to cores 11 and 12. A counterbore is provided in valve element 3 to effectively space the major portion of the valve element 3 from the inner core 12 to thus permit leakage of fluid under pressure in the main body 1 into the space above the valve element 3 between the cores 11 and 12 to equalize pressure when the valve element 3 is moving downwardly and to permit leakage from the confined space down to the main body 1 when the valve element moves upwardly. The inner periphery of valve element 3 includes track means comprising a pair of oppositely disposed, identically shaped, helical grooves 19, 20, each extending from diametrically opposite sides of the lower edge of valve 3 upwardly to substantially the midpoint thereof and serving to cooperate with the hereinafter described operating means 4 to raise and lower the valve element 3 with respect to its previously-described resilient O-ring seal 16. An O-ring 21 is disposed in a suitable annular recess in the outer periphery of valve element 3 to effect a seal between the valve element 3 and the outer core 11 of valve housing 2.

The operating means 4 for the valve element 3 comprises a cylindrical stem 22 disposed for rotation about its axis in the inner core 12 of valve housing 2. An O-ring 23 is disposed in a suitable annular groove or recess in the upper end of stem 22 to provide a seal for preventing leakage between the stem 22 and the inner core 12 of valve housing 2. The lower end of stem 22 is wider than the inner diameter of core 12 to lock the stem in an axial direction and carries transversely therethrough a pin 24 having its opposite ends each disposed in one of the grooves 19 and 20 on the inner periphery of valve element 3. An essentially conventional self-locking handle 25 is attached at the upper end of stem 22 externally of the housing for rotating the operating stem 22 about its axis, and to cooperate with the widened lower end of stem 22 to prevent axial motion of stem 22.

The angle cock device is shown in FIG. 1 in the open position wherein the valve element 3 is in its uppermost raised position and wherein the ends of pin 24 are registered in the lower ends of grooves 19, 20, thus permitting fluid to flow from hose 8 through apertures 5 in valve housing 2 to brake pipe 10. If now the handle 25 is rotated substantially 90° in a counterclockwise direction as viewed from the top in FIG. 2, the stem 22 is rotated about its axis 90° from the position shown carrying the ends of pin 24 therewith. Inasmuch as valve element 3 is prohibited from rotating with pin 24 because of the hexagonal bore 18 registering with the hexagonal outer periphery of core 12, the resultant force between the ends of pin 24 and the inclined walls of helical grooves 19, 20, forces valve element 3 downwardly until the upper ends of the helical groove register with the ends of pin 24, causing the lower end of valve 3 to descend to and pass through O-ring 16 to effect sealing engagement between O-ring 16 and the outer periphery of valve element 3, thus sealing the pipe 8 from the pipe 10. The valve element 3 is thus in the closed position. Conversely, when the handle 25 is rotated back to the initial position shown in FIG. 1, the force of the pin in grooves 19, 20 raises the valve 3 to the initial position shown, thus reopening the apertures 5.

Having now described the invention, what I claim as new and desire to secure by Letters Patent, is:

A valve device, comprising: a body having communicating passages therein and a bore through one wall thereof, a valve housing fitted in said bore to close the opening thereof, said housing comprising a pair of concentrically disposed core members, the outer core member of said pair of cores being closed at the outer end and extending across said body into engagement with the opposite wall thereof to separate the communicating passages, aperture means in the walls of said outer core to permit passage of fluid therethrough, resilient ring seal means compressed between said opposite wall and the inner end of said outer core member with the seal extending inwardly of the inner periphery of the outer core member, the inner core member being open at both ends and having its inner end terminating short of the inner end of the outer core member, said inner core member having a non-circular outer periphery, a tubular valve member disposed on said inner core member for reciprocal movement with respect thereto to open and close said aperture means in said outer core and having a non-circular portion on the inner periphery thereof mating with the outer periphery of said inner core member, valve operating means having a stem member disposed in said inner core for movement only about its axis and having its inner end extending beyond the inner end of said inner core member, a pair of oppositely disposed helical grooves on the inner walls of said tubular valve member, means laterally extending from the inner end of said stem member and slidably engaged in said grooves whereby rotation of the stem member about its axis effects corresponding movement of said laterally extending means causing the resultant force thereof in said grooves to move said valve member toward and away from engagement with said resilient seal, depending upon the direction of rotation of the stem.

References Cited in the file of this patent

UNITED STATES PATENTS

| | | |
|---|---|---|
| 1,738,250 | Judell et al. | Dec. 3, 1929 |
| 2,634,944 | Waite | Apr. 14, 1953 |
| 2,645,449 | Gulick | July 14, 1953 |
| 2,994,343 | Banks | Aug. 1, 1961 |
| 3,062,496 | Stehlin | Nov. 6, 1962 |

FOREIGN PATENTS

| | | |
|---|---|---|
| 916,807 | Germany | Aug. 19, 1954 |